Nov. 22, 1949     R. J. HARDY     2,488,909
SYSTEM INDICATING THE DIRECTION OF VARIATION
OF AN ELECTRIC QUANTITY, AND APPLICATIONS
Filed July 8, 1947
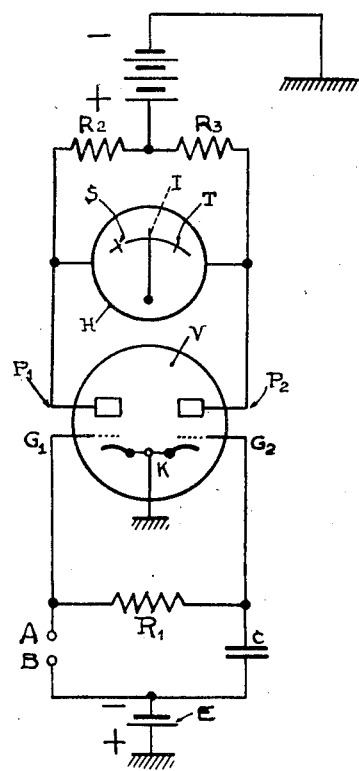
INVENTOR:
RENÉ J. HARDY
By John B. Brady
attorney Patented Nov. 22, 1949

2,488,909

UNITED STATES PATENT OFFICE 2,488,909

SYSTEM INDICATING THE DIRECTION OF VARIATION OF AN ELECTRIC QUANTITY, AND APPLICATIONS

René Jean Hardy, Paris, France, assignor to Societe Francaise Radio-Electrique, a corporation of France Application July 8, 1947, Serial No. 759,618
In France January 14, 1944

2 Claims. (Cl. 177—352)

My invention relates to a system for indicating the direction of a varying electric quantity and to applications of such directive systems.

More precisely, my invention discloses a device showing at any moment the direction in which a variable voltage or current varies (that is to increase or to decrease), or more generally an electric quantity the variation of which is liable to be transposed to become a variation of current.

My invention will be more clearly understood from the accompanying drawing. I provide a circuit arrangement upon which there is impressed the variable current under study and, another variable current, lagging on the first one the circuit provides means for comparing differentially these two currents or certain of their effects. If the first mentioned current exceeds the lagging current, that establishes that its variation is towards an increase; and it is, on the contrary, actually decreasing if it is the lagging current which exceeds the first one. Thus it appears that the sign (positive or negative) of the difference issuing from the comparison is in relation with the direction in which evolves the variation of the current. It must be understood that the said relation is liable to be reversed, according to the mode of comparison differentially applied, or to the nature of the effects on which the comparison is made.

For a better understanding of my invention, a description will hereinafter be given, by reference to the accompanying circuit diagram, of one form of my invention showing, as a particular example and non limitatively, the principles on which other applications can be carried out.

In the accompanying drawing, A and B designate the terminals between which is applied the variable current under test: its object being to determine the direction (increase or decrease) in which voltage varies. Between the same terminals I arrange in series a resistance R1 and a capacity C. The upper terminal A is connected to the grid or input circuit G1 of an amplifying tube V; the upper plate of the capacity C is connected to the grid G2 or input electrode of the amplifying tube V. In the example shown the grids or input electrodes G1 and G2 are combined in one and the same tube V which is shown in the diagram as a symmetrical double amplifier system or double-triode the double triode can be replaced by more complex amplifying systems, for instance a double-pentode. In the double triode represented, the cathodes K are connected and grounded. The terminal B is also grounded through a polarising source E. The plates P1 and P2 or output electrodes of the amplifying tube V are connected externally by two resistances R2 and R3, the common point of which is connected with the positive pole of a source the negative pole of which is grounded (or connected to the mass). A differential galvanometer or milliammeter is shunt connected between the plates P1 and P2.

The above device operates as follows. The voltage under test between terminals A and B charges the condenser C and the voltage of this latter tends to rise up to the AB voltage, but a certain lag is imposed to that rise by the resistance R1. The voltage difference $V_A - V_C$ is then positive and consequently the plate current intensity through $P_1$ is greater than the one through $P_2$. Being shunt connected between P1 and P2, the milliammeter H is controlled by equalizing currents, and its pointer moves over the central point I or zero of its scale for deviating towards S if the current between A and B is increasing, and towards T if it is decreasing.

Of course the circuit R1C can be replaced by any other means creating a lag or lead, i. e. involving a time constant, thus permitting a predetermined lag to be set in the transmission of a current.

Moreover the double tube V may be replaced by any equivalent device, known for instance as capable of operating the indicating instrument H in using the currents G1 and G2 offering, so to speak, a difference in phase.

Various means operative to start two sensitive effects differentiated according to the preponderance of the voltage either at G1 or at G2 can be substituted for the differential indicator. The indicator may be, such, for instance, as to start, with or without a relay, the lighting or the apparition of a source of light, or of a secondary signal. For instance two lighting sources or two signals may be used in such a way that they will show, according to the lighting of one or of the other source, what is the direction from which evolves the variation under study.

Such a device may find many applications of a great variety. For instance the current AB may issue from a detector rectifying the current collected by an aerial in a magnetic field. If an installation similar to the one hereinbefore described is carried by a moving body guided by a radio transmitter acting, for instance, as a radio beacon, the indicator will enable the pilot to ascertain whether he approaches nearer or deviates farther away with reference to the transmitter.

What I claim is:

1. An indicating system comprising in combination with a source of variable potential, a circuit having a substantially uniform time constant comprising a resistance and a capacity with one end of said resistance electrically connected in series with one side of said capacity, a pair of input terminals, a connection between the other end of said resistance and one of said input terminals, a connection between the other side of said capacity and the other of said input terminals, a source of negative polarization potential connected at one end to the latter terminal, a connection between the other side of said polarization potential and ground, an amplifier including a cathode, a control grid and an anode, a connection between said control grid and the first mentioned end of said resistance, another amplifier including a cathode, a control grid and an anode, a connection between said last mentioned control grid and the other end of said resistance, a connection between said cathodes and ground, a source of positive potential connected at its negative side to the ground, a resistance connected to one of said anodes and connected to said source of positive potential, another resistance connected to the other of said anodes and connected to said source of positive potential, and a milliammeter connected in parallel between the two anode circuits of said amplifier.

2. An indicating system comprising in combination with a source of variable potential, a circuit having a substantially uniform time constant comprising an impedance and capacity, with one end of said impedance electrically connected in series with one side of said capacity a pair of input terminals, a connection between the other end of said impedance and one of said input terminals, a connection between the other side of said capacity and the other of said input terminals, a source of negative polarization potential connected at one end to the latter terminal, a connection between the other side of said polarization potential and ground, an amplifier including a cathode, a control grid and an anode, a connection between said control grid and the first mentioned end of said impedance, another amplifier including a cathode, a control grid and an anode, a connection between said last mentioned control grid and the other end of said impedance, a connection between said cathodes and ground, a source of positive potential connected at its negative side to the ground, an impedance connected to one of said anodes and connected to said source of positive potential, another impedance connected to the other of said anodes and connected to said source of positive potential, and a milliammeter connected in parallel between the two anode circuits of said amplifier.

RENÉ JEAN HARDY.

REFERENCES CITED

The following references are of record in the file of this patent:

UNITED STATES PATENTS

| Number | Name | Date |
|---|---|---|
| 2,369,678 | McWhirter et al. | Feb. 20, 1945 |